(12) United States Patent
Chu

(10) Patent No.: US 9,273,734 B2
(45) Date of Patent: Mar. 1, 2016

(54) ROTATING TORQUE TRANSMISSION BUFFERED SHAFT

(71) Applicant: Feng-Sung Chu, Kaohsiung (TW)

(72) Inventor: Feng-Sung Chu, Kaohsiung (TW)

( * ) Notice: Subject to any disclaimer, the term of this patent is extended or adjusted under 35 U.S.C. 154(b) by 0 days.

(21) Appl. No.: 14/160,580

(22) Filed: Jan. 22, 2014

(65) Prior Publication Data

US 2014/0179447 A1 Jun. 26, 2014

(51) Int. Cl.
*F16D 1/12* (2006.01)
*F16D 3/08* (2006.01)

(52) U.S. Cl.
CPC ... *F16D 1/12* (2013.01); *F16D 3/08* (2013.01)

(58) Field of Classification Search
CPC ............. F16D 3/12; F16D 7/046; F16D 1/12; F16D 3/08
USPC ....................... 464/57, 60, 65.1, 161; 180/381
See application file for complete search history.

(56) References Cited

U.S. PATENT DOCUMENTS

| | | | | |
|---|---|---|---|---|
| 1,024,020 | A | * | 4/1912 | Perry ............................ 464/161 |
| 2,010,489 | A | * | 8/1935 | Ice ............................ 464/161 X |
| 2,991,637 | A | * | 7/1961 | Lochow .......................... 464/57 |
| 2014/0121703 | A1 | * | 5/2014 | Jackson et al. | |

FOREIGN PATENT DOCUMENTS

GB        7785    *   0/1907 .................... 464/161

* cited by examiner

*Primary Examiner* — Gregory Binda

(57) ABSTRACT

A rotating torque transmission buffered shaft is provided with a casing tube, a shaft tube and a lock mounting member. The casing tube is formed with a receiving space and the inner walls of both ends of the casing tube are formed with a first inner screw thread and a second inner screw thread respectively. The shaft tube is installed within the receiving space and the middle section of the shaft tube is formed with a screw thread portion corresponding to the first inner screw thread. The lock mounting member is engaged and locked on the second inner screw thread. The rotating torque transmission buffered shaft is applicable to ships and vehicles for public transportation. The buffered shaft can absorb and balance intense rotating torque generated instantly, and can reduce the torque difference generated during the operation due to the linkage between the engine and the transmission device.

1 Claim, 5 Drawing Sheets

ROTATING TORQUE TRANSMISSION BUFFERED SHAFT

BACKGROUND OF THE INVENTION

1. Field of the Invention

The invention relates to buffered shafts and more particularly to a rotating torque transmission buffered shaft which can transmit the torque force, generated from the power output of a vehicle or an engine through a gearbox or an automatic transmission device, to roll or rotate the tires.

2. Description of Related Art

According to the fact, regardless what the form to install an engine and driving wheels is, there must be a complete transmission line, namely a transmission shaft, between the engine and the engine-driven wheels in order to output the power of an engine to the wheels through the clutch, gearbox, transmission shaft, transmission assembly, and finally axle beam, that makes the tires to rotate and thus to drive the vehicle. Once the part of the transmission shaft is damaged, worn, deformed, and loss of dynamic balance can cause the car to make unusual noise and vibration while in driving. In worse cases, such condition can lead to damage to relevant parts. Besides, the transmission shaft is a rotary member of high rotation speed and with little support, and therefore having dynamic balance is critically important.

However, when a vehicle is travelling, changing gear or moving along an uneven road, the vehicle will generate more engine power which causes significant differences in speed ratio between tires as well as the transmission rotation speed to overload instantaneously leading to an unbalanced torque value and causing damage to the engine, gearbox, and differential device. Thus, the need for improvement still exists.

SUMMARY OF THE INVENTION

The main object of the invention is to provide a rotating torque transmission buffered shaft of simple structure to reduce undesired gear shifting and the degree of vehicle vibration.

According to the object described above, the rotating torque transmission buffered shaft of the invention includes a casing tube, a shaft tube and a lock mounting member.

The casing tube has a receiving space, wherein a first inner screw thread and a second inner screw thread are formed on the inner surface at both ends of the casing tube separately. A second spring body and a second ball bearing are connected to each other and installed in the receiving space.

One end of the shaft tube is installed inside the receiving space and a screw thread portion corresponding to the first inner screw thread is formed in the middle section of the shaft tube. The portion of the shaft tube located inside the receiving space is sleeved with a first ball bearing and a first spring body in sequence, and is locked with a mounting member at the end of the shaft tube in order to make the first ball bearing and the first spring body to be fixedly installed between the mounting member and the screw thread portion. One end of the mounting member is next to and against the second spring body.

The lock mounting member is placed and locked onto the second inner screw thread in order to keep the second spring body and the second ball bearing to fixedly remain within the receiving space, wherein a mounting rod, which is installed within the center of the mounting member, can be locked on to the shaft tube; wherein the front section of the shaft tube is installed with an universal joint; one side of the casing tube, where the lock mounting member is located, is installed with an universal joint; wherein the rotating torque transmission buffered shaft can be applied to transportation systems; wherein the transportation systems can be vehicles, ships or speed boats; and wherein the first inner screw thread and the screw thread portion are with a dual thread form.

The rotating torque transmission buffered shaft of the invention is applicable to the transmission shaft of a vehicle. When the vehicle engine transfers the torque force through the gearbox and the rotating torque transmission buffered shaft to set the tires to roll or rotate, it performs the function of engine-driven operation. By means of torsion between the first inner screw thread within the casing tube and the screw thread portion on the shaft tube, the rotating torque transmission buffered shaft can absorb and balance intense rotating torque generated instantly and can reduce the torque difference generated during the operation due to the linkage between the engine and the transmission device. The rotating torque transmission buffered shaft can also prolong the lifetime of the engine, gearbox, and differential device.

Furthermore, the rotating torque transmission buffered shaft can protect the engine-driven key components, effectively prevent fracture to the engine crankshaft, transmission gear shaft, differential device helical gear, and differential device helical gear shaft caused by improper human operations or a sudden change of the environment in which the transmission performs. At the same time, the rotating torque transmission buffered shaft can increase the vehicle stability and prolong mileages of tires.

The above and other objects, features and advantages of the invention will become apparent from the following detailed description taken with the accompanying drawings.

DETAILED DESCRIPTION OF THE INVENTION

Figure 1:
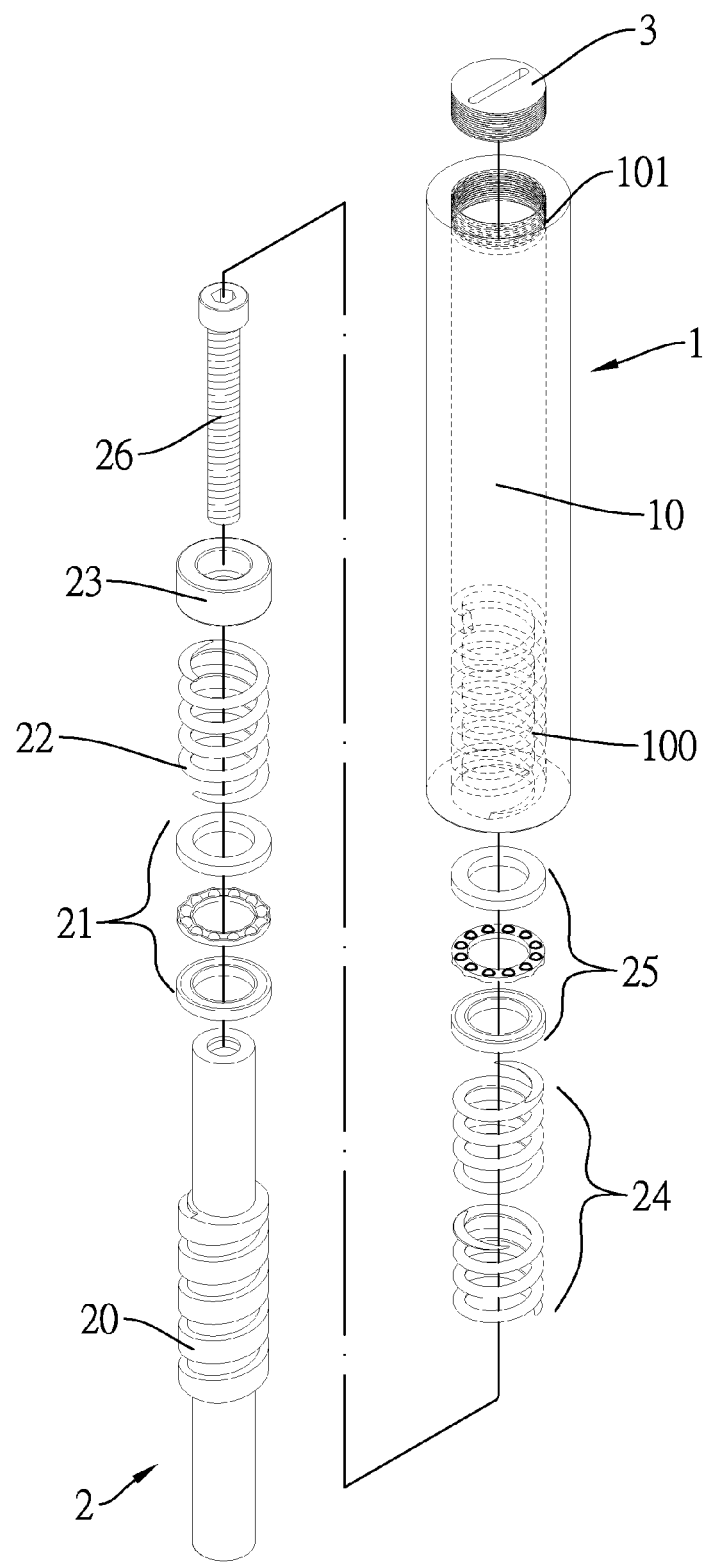
FIG. 1 is an exploded schematic view of the invention.
Figure 2:
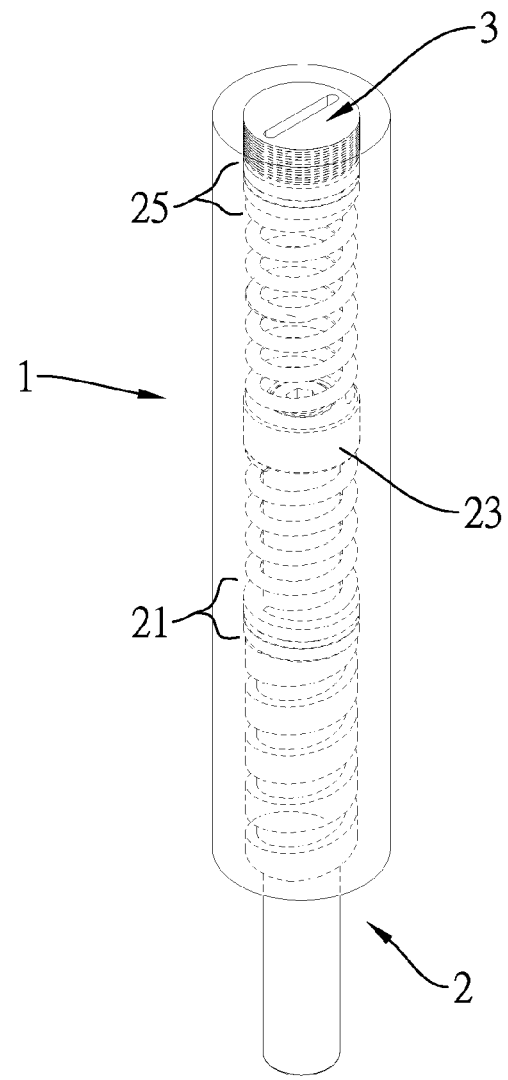
FIG. 2 is a schematic combination view of the invention.

First, with reference to FIG. 1 and FIG. 2, according to the figures, the rotating torque transmission buffered shaft of the invention comprises a casing tube 1, a shaft tube 2 and a lock mounting member 3.

The casing tube 1 has a receiving space 10, wherein a first inner screw thread 100 and a second inner screw thread 101 are formed on the inner surface at both ends of the casing tube 1 separately. A second spring body 24 and a second ball bearing 25 are connected to each other and installed inside the receiving space 10.

One end of the shaft tube 2 is installed inside the receiving space 10 and a screw thread portion 20 corresponding to the first inner screw thread 100 is formed in the middle section of the shaft tube 2. The portion of the shaft tube 2 located inside the receiving space 10 is sleeved with a first ball bearing 21 and a first spring body 22 in sequence, and is locked with a mounting member 23 at the end of the shaft tube 2 in order to make the first ball bearing 21 and the first spring body 22 to be fixedly installed between the mounting member 23 and the screw thread portion 20. One end of the mounting member 23 is next to and against the second spring body 24. A mounting rod 26, which is installed within the center of the mounting member 23, can be locked on to the shaft tube 2. The first inner screw thread 100 and the screw thread portion 20 are with a dual thread form.

The lock mounting member 3 is placed and locked onto the second inner screw thread 101 in order to keep the second spring body 24 and the second ball bearing 25 to fixedly remain within the receiving space 10.

Figure 3:
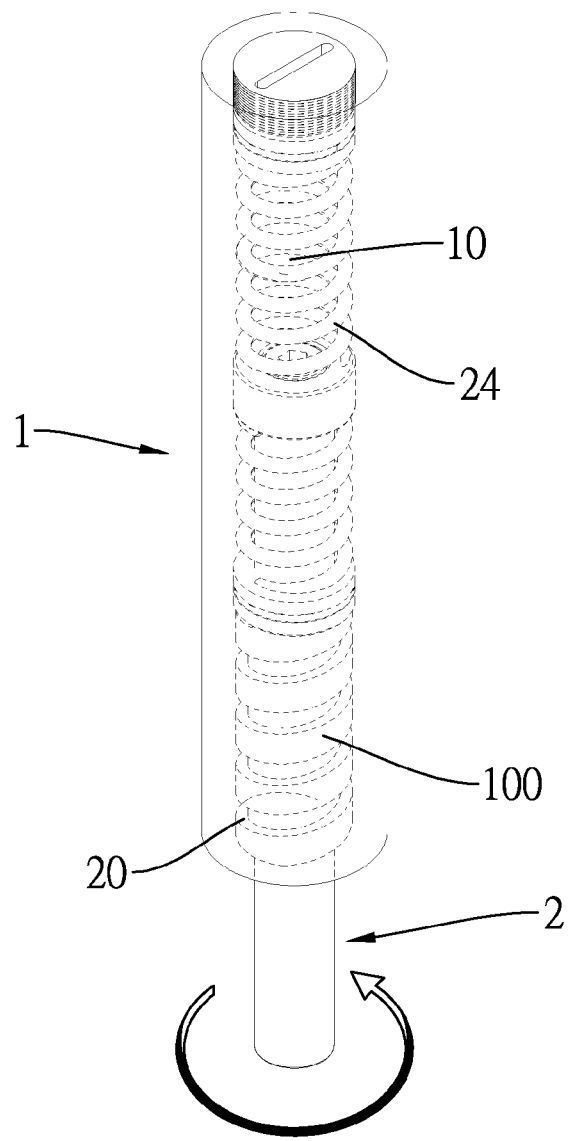
FIG. 3 is a schematic view of a first embodiment of the invention.
Figure 4:
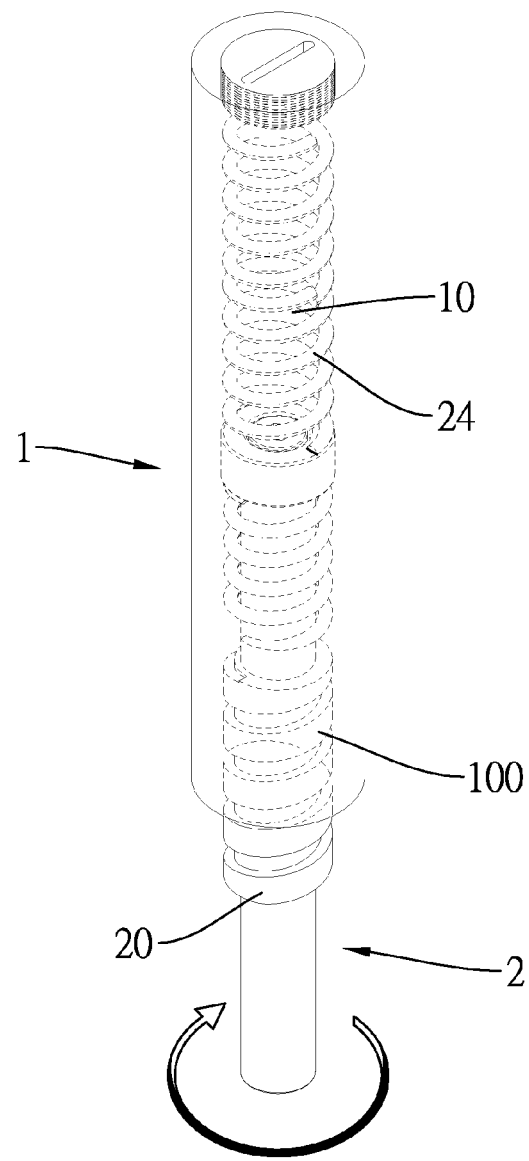
FIG. 4 is a schematic view of a second embodiment of the invention.

With reference to FIG. 3 and FIG. 4, according to the figures, the rotating torque transmission buffered shaft of the invention is mainly to have the shaft tube 2 installed within the receiving space 10 of the casing tube 1. By means of rotation between the screw thread portion 20 and the first inner screw thread 100, the rotating torque transmission buffered shaft can absorb and balance intense rotating torque generated instantly and, at the same time, can make the second spring body 24 in the receiving space 10 to compress or rebound. Therefore, when the rotating torque transmission buffered shaft is installed in large-sized transportation systems, such as vehicles, ships or speed boats, it can obtain a good buffer space during reversing or forwarding operations.

Figure 5:
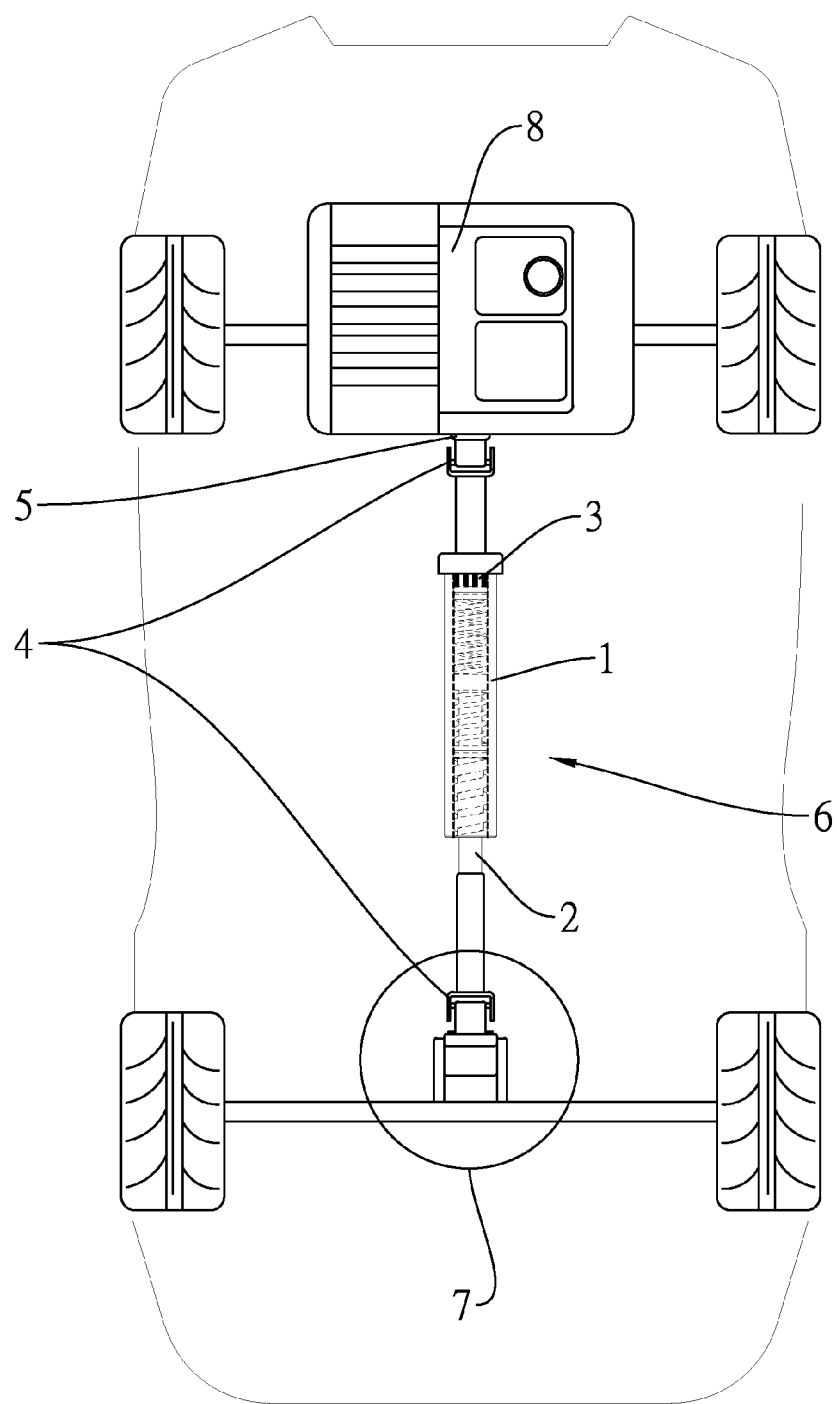
FIG. 5 is a schematic view of a third embodiment of the invention.

Last, with reference to FIG. 5, the rotating torque transmission buffered shaft of the invention is mainly installed in large-sized transportation systems, such as ships, speed boats and vehicles. The invention uses vehicles as an example. According to the figure, the front section of the shaft tube 2 is installed with a universal joint 4; one side of the casing tube 1, where the lock mounting member 3 is located, is installed with a universal joint 4.

Vehicles installed with the invention are presented as an example. The structure comprises a universal joint 4, a sliding joint 5, a rotating torque transmission buffered shaft 6, and a rear axle assembly 7. When the vehicle engine transfers the torque force through the gearbox 8 and the rotating torque transmission buffered shaft 6 to set the tires to roll or rotate, it performs the function of engine-driven operation. The rotating torque transmission buffered shaft 6 mainly can absorb and balance intense rotating torque generated instantly, and can reduce the torque difference generated during the operation due to the linkage between the engine and the transmission device. Therefore, the rotating torque transmission buffered shaft can protect the mechanic devices including the engine, gearbox 8, and differential device; prolong the lifetime of the engine, gearbox, and differential device; and increase the vehicle stability and mileages of tires.

In summary, advantages of the rotating torque transmission buffered shaft of the invention are as follows. The rotating torque transmission buffered shaft, can absorb and balance intense rotating torque generated instantly, and can reduce the torque difference generated during the operation due to the linkage between the engine and the transmission device; can protect the mechanic devices including the engine, gearbox, and differential device and prolong the lifetime of the engine, gearbox, and differential device; can maintain the effect of a comfortable ride when the vehicle is operated at a high or low speed; can minimize the mental weariness of the drivers or operators during a long period of driving or operations as well as maintain the driving safety when drivers engage in the long-distance driving; can make the step-on and release operation of transmission clutch more easily and maintain a smooth start of manual transmission vehicles and trucks regardless of medium-high load, low load and for hill-start; increases the vehicle stability and mileages of tires; ensures a smooth acceleration and reduces undesired gear shifting and the degree of vehicle vibration while the vehicle is at high speed or during automatic gear shift; can effectively prevent vehicle tires from skidding out of control while making a turn; can protect the engine-driven key components, effectively prevent fracture to the engine crankshaft, transmission gear shaft, differential device helical gear, and differential device helical gear shaft caused by improper human operations or a sudden change of the environment in which the transmission performs; and can reduce the installation cost and the space occupied if the rotating torque transmission buffered shaft is installed on the buffer device of the yacht.

Although the invention has been described in detail, it is to be understood that this is done by way of illustration only and is not to be taken by way of limitation. The scope of the invention is to be limited only by the appended claims.

What is claimed is:

1. A torque shock absorbing device, comprising:
   a casing tube including an internal space, first internal threads at a first end, and second internal threads at a second end;
   an externally threaded cap threadedly secured to the first internal threads;
   a first bearing disposed in the internal space and having a first end engaging the externally threaded cap;
   a first biasing member disposed in the internal space and having a first end biasing against a second end of the first bearing;
   a shaft tube including external threads threadedly secured to the second internal threads so as to partially dispose the shaft tube in the internal space;
   a second bearing disposed in the internal space and put on the shaft tube, the second bearing having a first end engaging the external threads of the shaft tube;
   a second biasing member disposed in the internal space and put on the shaft tube, the second biasing member having a first end biasing against a second end of the second bearing;
   a hollow mounting member disposed in the internal space and having a first end engaging a second end of the second biasing member and a second end engaging a second end of the first biasing member; and
   an externally threaded bolt driven through the hollow mounting member into the shaft tube;
   wherein the shaft tube is configured to rotate either counterclockwise to compress both the first and second biasing members or clockwise to expand both the first and second biasing members.

* * * * *